United States Patent
Aue et al.

(10) Patent No.: US 8,224,276 B2
(45) Date of Patent: Jul. 17, 2012

(54) METHOD AND ARRANGEMENT FOR SIGNAL PROCESSING IN A RECEIVER THAT CAN BE TUNED TO DIFFERENT CARRIERS

(75) Inventors: Volker Aue, Dresden (DE); Sebastien Amiot, Bieville-Beuville (FR)

(73) Assignee: ST-Ericsson SA (CH)

( * ) Notice: Subject to any disclaimer, the term of this patent is extended or adjusted under 35 U.S.C. 154(b) by 840 days.

(21) Appl. No.: 12/363,158

(22) Filed: Jan. 30, 2009

(65) Prior Publication Data

US 2009/0221249 A1 Sep. 3, 2009

(30) Foreign Application Priority Data

Jan. 31, 2008 (EP) ..................................... 08101153

(51) Int. Cl.
*H04B 1/18* (2006.01)

(52) U.S. Cl. ................ 455/192.1; 455/150.1; 455/182.1

(58) Field of Classification Search ................ 455/3.02, 455/63.1, 67.11, 67.13, 150.1, 179.1, 182.1, 455/188.1, 192.1; 348/726, 729, 735; 375/346
See application file for complete search history.

(56) References Cited

U.S. PATENT DOCUMENTS

| | | | | |
|---|---|---|---|---|
| 5,134,707 A * | 7/1992 | Sakashita et al. | ............ | 455/3.02 |
| 5,574,995 A * | 11/1996 | Masaki | ...................... | 455/161.2 |
| 7,110,465 B2 * | 9/2006 | Kaku et al. | .................... | 375/285 |
| 7,512,197 B2 * | 3/2009 | Furman et al. | ................ | 375/346 |
| 2006/0287009 A1 | 12/2006 | Arad | | |

FOREIGN PATENT DOCUMENTS

| | | |
|---|---|---|
| GB | 2396531 B | 6/2004 |
| WO | 0106768 A1 | 1/2001 |

* cited by examiner

*Primary Examiner* — Quochien B Vuong
(74) *Attorney, Agent, or Firm* — Potomac Patent Group PLLC

(57) ABSTRACT

A method and circuit for signal processing in a receiver that can be tuned to different carriers, the method determining the energy of the adjacent carriers N+1 and N−1, wherein a carrier N contains a signal of interest and the receiver is tuned to it, from the digital signal, in that the energy value of the carriers N+1 and N−1 determined are compared with a threshold value, and in the case where the threshold value is exceeded, a frequency shift of the signal by +Δf or −Δf is effected in the second method step prior to the filtering, and the frequency shift thus produced is reversed by a frequency shift by −Δf or +Δf prior to the filtering, and the signal is decoded.

12 Claims, 4 Drawing Sheets

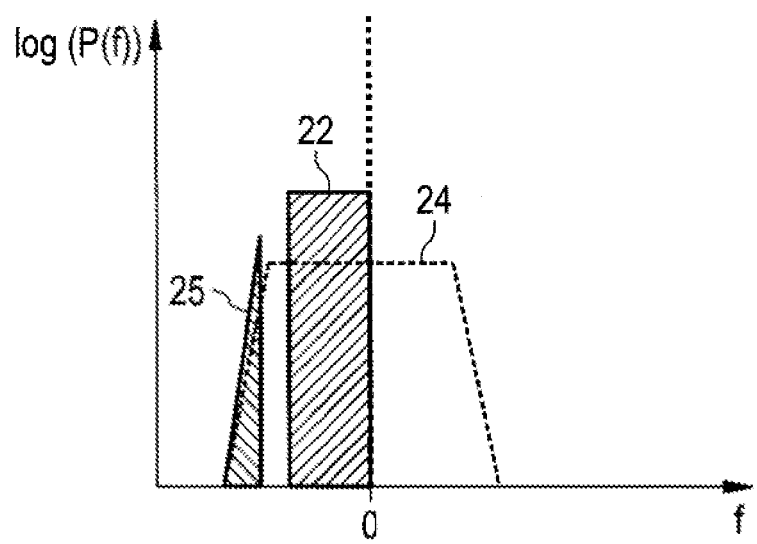

METHOD AND ARRANGEMENT FOR SIGNAL PROCESSING IN A RECEIVER THAT CAN BE TUNED TO DIFFERENT CARRIERS

BACKGROUND

1. Technical Field

The disclosure relates to a method for signal processing in a receiver that can be tuned to different carriers, wherein the analog signal received via an antenna is filtered and amplified in a first method step and is converted into a baseband frequency and filtered in a second method step, and, in a third method step, a digital signal is generated from the analog signal by means of an analog-to-digital conversion, and, in a fourth method step, the digital signal is filtered and subsequently decoded and the decoded data are output.

The disclosure also relates to an arrangement for implementing the method that includes a receiver having an antenna input, to which an antenna is connected and which has on the output side a bandpass filter and a baseband arrangement connected downstream of the receiver and having an input-side analog-to-digital converter, which is connected to the bandpass filter, and an output for outputting the decoded data.

2. Description of the Related Art

For the transmission of a signal of interest it is customary, not just for wireless transmission methods, to convert the signal of interest to be transmitted, which includes the information items to be transmitted, into a so-called carrier signal—or the carrier for short. The carrier represents a temporally variable quantity, for example a current or a voltage, which changes in at least one of its parameters such as frequency, phase, amplitude, duty ratio depending on the signal of interest. Thus, upon application of a QPSK modulation, for example, the signal of interest is mapped in the phase angle of the carrier, wherein two cosinusoidal signals of the same frequency with a phase shift of 90° with respect to one another are utilized as carrier in this case in order to transmit both a real part and an imaginary part. After this step—also referred to as modulation of the carrier—and transmission via a transmission channel, the signal of interest is recovered in a receiver by means of a demodulation method. For this purpose, it is necessary to tune the receiver to a specific carrier having the signal of interest in its modulated form.

DVB-H is a promising standard for the transmission of offered digital television contents for mobile TV receivers. DVB-H is based on the existing DVB-T standard and uses existing DVB-T transmission devices and the existing infrastructure. Transmission is provided in the existing TV frequency channel of the UHF band. Consequently, the bandwidth corresponds to the bandwidth of the analog TV frequency channels, which is dependent on the prevailing standard in the respective country and has a value of 6, 7, or 8 MHZ.

A DVB-H variant in which the L bands are used is additionally specified. A bandwidth of 5 MHz in accordance with the L band channel spacings is defined for this variant. DVB-H networks of this type are constructed in many countries in Europe. Other countries, for example the USA and China, are considering the use of DVB-H networks for a limited period.

Another standard for providing TV content for mobile devices is T-DMB. As in DVB-H, the use of existing transmission devices is possible in T-DBM, too. In this case, however, use is made of existing transmission devices according to the DAB standard (digital audio broadcasting), which uses a bandwidth of 1.6 MHz and a third of the 8 MHz channel spacing. DAB is designed to work both in the VHF band and in the lower L band and for satellite reception below 3 GHz. T-DMB is used in Korea, for example. Other countries, such as Germany and Great Britain, promote both standards.

While China is currently developing its own standard DMB-H, this country is probably the first to allow provision of DVB-H and T-DMB networks and offered services until corresponding DMB-H devices are available.

In the case of large network operators which use broadcasting transmitters which enable both DVB-T- and DAB-based transmissions, there is the need to provide corresponding receivers which can receive both standards.

Mobile TV receivers, receivers for mobile telephones and small handheld devices differ significantly from those receivers which were originally developed for digital receiver applications (set-top box) or in the case of the DAB standard from car radios and other portable broadcasting receivers.

In the development of new receivers, which process more than one of the abovementioned standards, they are additionally intended to have a low energy consumption and small dimensions. Such properties are achieved only inadequately with known DVBT and DAB solutions.

Most semiconductor manufacturers offer, for mobile TV receivers, energy-saving silicon receivers which support the DVB-H standard, for example with the channel bandwidths of 5, 6, 7 and 8 MHZ. New developments will additionally have to support the T-DMB standard as dual-mode tuners.

In this case, although most of the known receivers meet the requirements with regard to the frequencies to be supported, which are necessary for applications of this type, they do not satisfy the required analog filter bandwidths for achieving the required frequency selectivity.

Consequently, new receiver layout developments are necessary. What is disadvantageous in this case is the fact that analog filters having a decreasing bandwidth have a larger space requirement and this is at odds with the trend towards further miniaturization.

BRIEF SUMMARY

Consequently, the disclosed embodiments provide a method and an associated circuit arrangement for signal processing in a receiver that can be tuned to different carriers, whereby the outlay in the development and production of receivers supporting a plurality of standards and the space requirement on the chip are reduced.

According to the disclosure, in the case of a method for signal processing in a receiver that can be tuned to different carriers of the type mentioned in the introduction, the energy of the adjacent carriers N+1 and N−1, wherein a carrier N contains a signal of interest and the receiver is tuned to it, is determined from the digital signal. More particularly, the energy value of the carriers N+1 and N−1 determined are compared with a threshold value, in that in the case where the threshold value is exceeded, a frequency shift of the signal by +Δf or −Δf is effected in the second method step prior to the filtering, and in that the frequency shift thus produced is reversed by a frequency shift by −Δf or +Δf in the fourth method step prior to the filtering and the signal is decoded.

The method according to the disclosure can be applied in receiver arrangements that have an analog receiver connected to an antenna on the input side, the receiver having on the output side quadrature outputs, for example, upstream of which a low-pass filter is connected and downstream of which a digital baseband arrangement is connected. The method makes it possible to use low-pass filters having a bandwidth wider than that required by the respective standard. This becomes possible since the method carries out a frequency shift by −Δf or +Δf in such a way that the adjacent channel interference present alongside the useful channel N is shifted at least to the edge of the characteristic curve of the low-pass filter and is therefore attenuated to a greater extent. In this case, the frequency shift is effected towards the upper limiting frequency of the low-pass filter for the case where the adjacent channel interference lies on the carrier N+1. Conversely, the frequency shift is effected towards the lower limiting frequency of the low-pass filter for the case where the adjacent channel interference lies on the carrier N−1.

The frequency shift thus generated is eliminated according to the method in the digital baseband arrangement by means of a corresponding inverse frequency shift.

In order to ascertain what type of frequency shift is necessary, an ACI detector is arranged in the digital baseband arrangement. The detector determines the energies of the adjacent channels N−1 and N+1 and checks whether they lie above a defined threshold value. When the threshold value is exceeded, the ACI detector generates control signals that control the frequency shift, on the one hand, and the inverse frequency shift, on the other hand.

In one configuration, the energy of a carrier N, which contains a signal of interest and to which the receiver is tuned, is determined from the digital signal and is used for threshold value setting in such a way that the ratio of the energy of the carrier N and the energy of the adjacent carriers N+1 or N−1 determines the threshold value and thus the frequency shift.

The threshold value used for making the decision as to whether a frequency shift is necessarily carried out can be adapted to changing reception conditions. For this purpose, by way of example, the energy of a carrier N containing a signal of interest is put into the ratio with respect to an adjacent channel interference or considered by itself. As long as the carrier N has a significantly larger energy value than an adjacent channel interference, the threshold value can be set correspondingly high, and if the carrier N has a small energy value, the threshold value will be correspondingly adapted and smaller.

According to the disclosure, in the case of an arrangement for signal processing in a receiver that can be tuned to different carriers of the type mentioned in the introduction, the object is achieved by virtue of the fact that there is arranged in the baseband arrangement an ACI detector which determines the energy of the carriers and which has a first control output, which is fed back from the digital baseband arrangement into the analog receiver in such a way that it is connected in controlling fashion to a frequency shifting arrangement that acts upon the antenna input with a frequency shift. In addition, it has a second control output, which, within the digital baseband arrangement is connected in controlling fashion to an arrangement for correcting the frequency shift, which arrangement revises the frequency shift.

The disclosure provides for an ACI detector in the baseband arrangement to check whether adjacent channel interferences occur. If this is the case, the ACI detector generates both the first control signal, which controls the frequency shift in the analog receiver, and the second control signal, which reverses the frequency shift in the digital baseband arrangement. In the receiver, the received signal received via the antenna firstly passes via a bandpass filter and a low noise amplifier to the input of the frequency shifting arrangement. The frequency shift according to the disclosure is carried out in the arrangement. For this purpose, the frequency shifting arrangement has a second input for the first control signal. After the frequency shifting arrangement has performed the frequency shift and also the conversion of the received frequency into a zero frequency, the signal generated or converted in this way is output at the frequency output of the frequency shifting arrangement.

In a particular embodiment, the frequency shifting arrangement has a frequency generator, which has a control input connected to the first control output of the ACI detector, a received signal input and a frequency output, which is connected to the low-pass filter and in which a multiplier that applies the frequency shift to the received signal is arranged between the received signal input and the frequency output.

A frequency generator present in the receiver is used for the frequency shifting, the frequency generator changing its frequency under the control of the first control signal. In this case, only a portion of the frequency generated by the frequency generator is influenced by the first control signal since the portion is usually used for converting the received frequency into a zero frequency, that is to say a frequency that is expected by the baseband arrangement on the input side. The frequency generated by the frequency generator is superposed by the received signal that has been received via the antenna, filtered and amplified, and thus generates the frequency shift from the zero frequency by −Δf or +Δf. A multiplier is used for this purpose, to which is fed at its inputs firstly the filtered and amplified received signal present at the received signal input and secondly the signal generated by the frequency generator. The signal generated by the multiplier is output at the frequency output. In the case of received signals having a real part and an imaginary part, two multipliers are used, that is to say one for the real part and one for the imaginary part of the signal. In this case, the output signal generated by the frequency generator is fed to one multiplier directly and to the second multiplier indirectly in a manner phase-shifted by 90 degrees via a phase shifting arrangement.

In a first circuit arrangement of the disclosure, the antenna input is connected to an input of a bandpass filter, an output of the bandpass filter is connected to an input of a low noise amplifier, an output of the low noise amplifier is connected to the received signal input of the I/Q mixing arrangement, the I/Q mixing arrangement has a first and a second multiplier and also a phase shifting arrangement, wherein the received signal input of the I/Q mixing arrangement is respectively connected to a first input of the first multiplier and a first input of the second multiplier, the control input of the I/Q mixing arrangement is connected to a second input of the first multiplier directly and to a second input of the second multiplier via the phase shifting arrangement, and the I/Q mixing arrangement has a first and a second frequency output. The first frequency output is connected to the output of the first multiplier and the second frequency output is connected to the output of the second multiplier, and the frequency outputs of the I/Q mixing arrangement are respectively connected to an input of a low-pass filter circuit. In this case outputs of the low-pass filter circuit respectively form the outputs of the receiver and the outputs of the receiver are respectively connected to an input of a baseband arrangement connected downstream.

Each input of the baseband arrangement is connected to an input of an analog-to-digital converter. The outputs of the analog-to-digital converters are respectively connected to an input of an arrangement for correcting the frequency shift. Furthermore, in the circuit arrangement solution, it is provided that the outputs of the circuit for correcting the frequency shift are respectively connected to an input of a first digital low-pass filter, the outputs of the first digital low-pass filter are connected to inputs of a sampling rate converter connected downstream, the outputs of the sampling rate converter are connected both to inputs of a second digital low-pass filter and to inputs of an ACI detector, the outputs of the second digital low-pass filter are connected to inputs of a demodulator, and an output of the demodulator is connected to the output of the baseband arrangement for outputting the decoded data bits. In addition, the ACI detector has a first and a second control output, wherein the first control output is connected to an input of a frequency generator and an output of the frequency generator is connected to a second input of the I/Q mixing arrangement, and the second control output of the ACI detector is connected to a further input of the arrangement for correcting the frequency shift.

In a second circuit arrangement of the present disclosure it is provided that the antenna input is connected to an input of a bandpass filter, an output of the bandpass filter is connected to an input of a low noise amplifier, an output of the low noise amplifier is connected to the received signal input of the I/Q mixing arrangement, and the I/Q mixing arrangement has a first and a second multiplier and also a phase shifting arrangement. Moreover, the received signal input of the I/Q mixing arrangement is respectively connected to a first input of the first multiplier and a first input of the second multiplier, the control input of the I/Q mixing arrangement is connected to a second input of the first multiplier directly and to a second input of the second multiplier via the phase shifting arrangement, and the I/Q mixing arrangement has a first and a second frequency output.

In addition, the first frequency output is connected to the output of the first multiplier, and the second frequency output is connected to the output of the second multiplier, the frequency outputs of the I/Q mixing arrangement are respectively connected to an input of a low-pass filter arrangement, the outputs of the low-pass filter arrangements respectively form the outputs of the receiver, the outputs of the receiver are respectively connected to an input of a baseband arrangement connected downstream, and each input of the baseband arrangement is connected to an input of an analog-to-digital converter. The outputs of the analog-to-digital converters are respectively connected to an input of an arrangement for correcting the frequency shift, the outputs of the arrangement for correcting the frequency shift are respectively connected to an input of a first digital low-pass filter, the outputs of the first digital low-pass filter are connected to inputs of a sampling rate converter connected downstream, and the outputs of the sampling rate converter are connected to the inputs of a second digital low-pass filter.

The outputs of the second digital low-pass filter are connected to inputs of a decimation arrangement, the outputs of the decimation arrangement are connected to inputs of an arrangement for removing a guard interval, the outputs of the guard interval removal arrangement are connected to inputs of an FFT circuit, outputs of the FFT circuit are connected both to the inputs of a demodulator directly or via an interposed second digital low-pass filter and to the inputs of a ACI detector. An output of the demodulator is connected to the output of the baseband arrangement for outputting the decoded data bits, the ACI detector has a first and a second control output, wherein the first control output is connected to an input of a frequency generator, and an output of the frequency generator is connected to a second input of the I/Q mixing circuit. The second control output of the ACI detector is connected to a further input of the I/Q mixing circuit for correcting the frequency shift.

One difference between the two embodiments is in a changed partial circuit in the digital baseband circuit. If the modulation method used for transmitting the information items is an OFDM modulation method, the differences in the arrangement part of the baseband circuit are necessary since otherwise sufficient suppression of the adjacent channel interferences is not achieved.

In accordance with another embodiment of the present disclosure, a method of signal processing in a receiver adapted to be tuned to different signal carriers received on an antenna is provided. The method includes filtering and amplifying a received analog signal from the antenna; converting the filtered and amplified analog signal into a baseband frequency signal that is filtered; generating a digital signal from the filtered baseband frequency signal by means of an analog-to-digital conversion method; and circuit filtering the digital signal and decoding the filtered digital signal to output decoded data; and determining from the digital signal the energy of adjacent carriers N+1 and N−1, wherein a carrier N contains a signal of interest to which the receiver is tuned, and comparing energy values of adjacent carriers with a threshold value, and where the threshold value is exceeded, frequency shifting the baseband frequency prior to the filtering of the baseband frequency signal, and reversing the shifting of the baseband frequency prior to filtering of the digital signal.

In accordance with another embodiment of the present disclosure, a circuit is provided, the circuit including a bandpass filter and low noise amplifier adapted to filter and amplify a received analog signal; an I/Q mixing circuit adapted to receive the filtered and amplified signal and to output a baseband frequency signal that is filtered, the I/Q mixing circuit comprising first and second multipliers for phase shifting the baseband frequency signal prior to filtering; and a baseband circuit that includes an analog-to-digital converter that receives the filtered baseband frequency signal and outputs a digital signal to a filter and decoder that output a filtered digital signal and decoded data, respectively, the baseband circuit further including a frequency shifting circuit that reverses the frequency shift of the first and second multipliers in the I/Q mixing circuit, a filter that filters the frequency-shifted digital signal and outputs the same to a sampling rate converter that converts the signal with a sampling rate, the output of which is filtered, and the filtered signal is divided by the divisor 2 in a decimation circuit, the baseband circuit further including an ACI detector that receives the sampled output signal from the sampling rate converter and generates a control signal to a frequency generator that outputs a control signal to the first and second multipliers in the receiver and a control signal to the frequency shift circuit.

In accordance with another aspect of the foregoing embodiment, the ACI detector is adapted to determine from the sampled digital signal the energy of adjacent carriers to a carrier signal N that contains a signal of interest and to compare the energy value of the adjacent carriers with a threshold value and determine a frequency shift control signal for the frequency generator 4 and the frequency shift circuit 13.

In accordance with another aspect of the foregoing embodiment, the ACI circuit compares the energy value of the adjacent carriers N+1 and N−1 with the threshold value in determining the frequency shift.

BRIEF DESCRIPTION OF THE SEVERAL
VIEWS OF THE DRAWINGS

The embodiments of the disclosure will be explained in more detail below on the basis of an exemplary embodiment. In the associated drawings.

Figure 5:
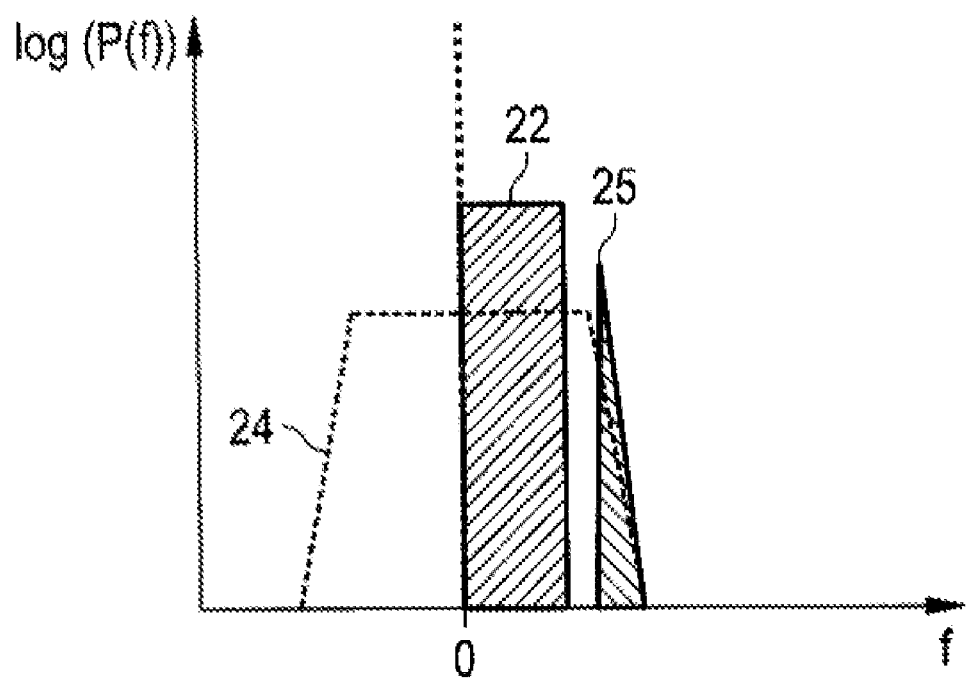

FIG. 5 shows a further illustration of a frequency spectrum with the effect of the low-pass filter on the adjacent channel interference of the carrier N+1 upon application of the frequency shift according to one embodiment of the disclosure; and FIG. 6 shows a further illustration of a frequency spectrum with the effect of the low-pass filter on an adjacent channel interference of the carrier N−1 upon application of the frequency shift according to the disclosure.

DETAILED DESCRIPTION

The present disclosure provides an alternative solution for dual mode tuners, in which solution it is not necessary for the receiver layer to be completely revised and, consequently, the development costs and also the development times can be reduced since it is possible to have recourse to receiver layouts that originally were not designed for a dual mode tuner application.

The solution according to the disclosure requires revision of the analog filter structure with either a small additional arrangement or higher limiting frequencies, the space requirement on the chip remaining small.

Present-day solutions in the area of digital communications usually includes the following listed assemblies:

Tuner or radio receiver, which realizes a signal amplification and a conversion of the frequency of the received signal into a lower intermediate frequency or a conversion into baseband.

Analog channel filters, which are required for suppressing adjacent channel interference (ACI). A saturation of the analog-to-digital converter (ADC), on the one hand, and the aliasing effect, on the other hand, are thus avoided.

For the case where the adjacent channel interference is not fully suppressed, the sampling rate of the analog-to digital converter must be higher than the required sampling rate for representing the signal in digital form. An additional digital filter is used for eliminating the residual ACI interference.

An adaptation of the signal to the sampling rate defined in the standard of the application is realized subsequently.

Depending on the development stipulations, the following objectives are advantageously achieved by the embodiments of the present disclosure.

Semiconductor manufacturers that use already existing DVB-H receiver solutions and develop dual mode tuner solutions have to carry out adaptations for meeting the requirements imposed by the two standards with regard to reception range, frequency pattern, and channel filter for suppressing adjacent channel interference. The disclosure achieves a reduction of the required design changes in the region of the receiving arrangement because the requirement for a narrow-band nature of the analog channel filter on account of the bandwidth of the DAB signal is realized according to the disclosure and not by hardware changes.

In the case of DVB-H receivers from prior designs, the analog filter of the receiver takes up a significant area region of the silicon chip. This space requirement increases further with the requirement for a smaller bandwidth of the analog filter. The disclosure realizes the selectivity requirements of the analog filter without significant revisions of the analog filter arrangement of the chip, and thus achieves a space saving on the chip by comparison with narrower-band filters.

According to the disclosure, it is possible to use a receiver analog filter arrangement that has a larger bandwidth than the required bandwidth developed for the dual mode tuner arrangement. The disclosure realizes an adjacent channel suppression that is similar or identical to a solution specifically adapted to the smaller bandwidth.

Figure 1:
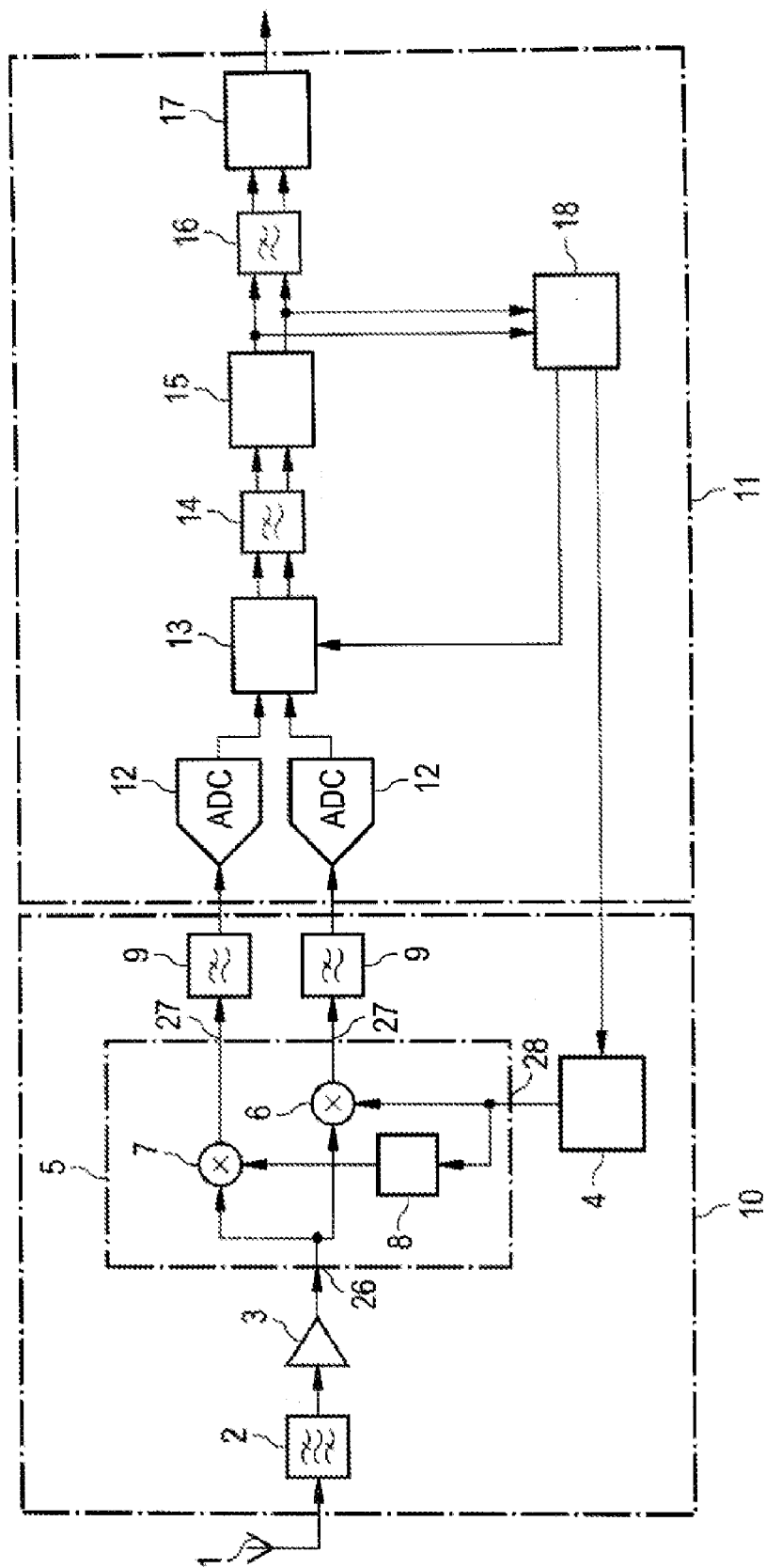
FIG. 1 shows a circuit arrangement according to the disclosure for implementing the method.

As illustrated in FIG. 1, the signal received via the antenna 1 is filtered by means of a bandpass filter 2 and fed to low noise amplifier (LNA) 3. The amplified output signal of the low noise amplifier 3 is converted into a frequency lying near the baseband by means of a frequency generated in a frequency generator 4 coupled to the I/Q mixing arrangement 5. For this purpose, the frequency generated by the frequency generator 4 is fed directly to a first multiplier 6 and is fed to a second multiplier 7 via a phase shifting arrangement in a frequency variant shifted by $\pi/2$.

The output signals of the multipliers 6, 7 are subsequently fed respectively to a low-pass filter arrangement 9 and the first and second output signals of the receiver 10 that are filtered in this way are generated.

For this purpose, the signal is shifted from its central position towards an edge of the low-pass filter arrangement 9; that is to say a frequency shift in the direction of either the upper or the lower limiting frequency of the low-pass filter arrangement 9 is performed.

The multiplied signals are thus low-pass-filtered, with the bandwidth of the low-pass filter arrangement 9 being larger than the bandwidth of the signal of interest.

The output signals of the receiver 10 which are generated in this way are input signals of the downstream baseband arrangement 11 and are fed as input signals to a respective analog-to-digital converter (ADC) 12. After the conversion of the analog input signal into a digital output signal that is performed by the ADC 12, the frequency shift is reversed again in the digital domain in the arrangement for correcting the frequency shift 13 that is displayed downstream of the ADCs 12. Measures for further suppression of adjacent channel interference of the type known from prior designs are furthermore carried out. The signal subsequently filtered by a digital low-pass filter is fed to the sampling rate converter.

The latter reduces the sampling rate to an integral value of the system's basic sampling rate. The signal adapted in terms of the sampling rate in this way is fed to a second digital low-pass filter 16, and a further suppression of adjacent channel interference is thus realized.

The second digital low-pass filter 16 may comprise a decimation stage for reduction to the basic sampling rate of the system.

The output of the second digital low-pass filter 16 is connected to the demodulator 17 connected downstream, the demodulator having an output for outputting the demodulated received bits.

According to the disclosure, an ACI detector 18 is additionally used, which identifies the presence of adjacent channel interference exceeding a predetermined interference level and also the position of the adjacent channel interference in the spectrum of the signal of interest. The term "position" means a shift of the adjacent channel interference relative to the signal of interest to a higher or lower frequency. The ACI detector 18 generates two output signals dependent on the position of the adjacent channel interference.

By means of the first output signal of ACI detector 18, the frequency generator 4 in the receiver 10 is controlled in such a way as to result in a frequency shift in the direction of the upper or lower limiting frequency of the low-pass filter arrangement 9 in a manner dependent on the position of the adjacent channel interference. By way of example, if the adjacent channel interference is shifted towards a higher frequency relative to the signal of interest, the signal is shifted in the direction of the upper limiting frequency of the respective low-pass filter arrangement 9 by the frequency shift, and vice versa.

What is achieved by means of the frequency shift is that the adjacent channel interference lies outside the transfer characteristic curve of the low-pass filter arrangement 9 and is thus correspondingly attenuated.

By means of the second output signal, the arrangement for correcting the frequency shift 13 in the baseband arrangement 11 is controlled in such a way that the frequency shift described above is correspondingly eliminated. This correction is effected here in the digital domain.

If the modulation method OFDM (OFDM . . . Orthogonal Frequency Division Multiplex) is used for signal transmission, then a residual adjacent channel interference is still present in the output signal generated by the sampling rate converter 15. In a specific embodiment of the disclosure, the filter properties of FFT (FFT . . . Fast Fourier Transformation) are used for suppressing the adjacent channel interference.

In this case, the second digital low-pass filter 16 upstream of the demodulator 17 suppresses the adjacent channel interference to a sufficient extent such that the adjacent channel interference does not bring about an attenuation that would lead to aliasing effects. That is to say that the low-pass filter suppresses the adjacent channel interference to a level such that the adjacent channel interference is not superposed on the signal of interest if the FFT is carried out. If the accuracy of the FFT affords sufficient freedom for the residual adjacent channel interference and does not reduce the signal of interest, the ACI detector can be arranged downstream of the FFT arrangement.

Figure 2:
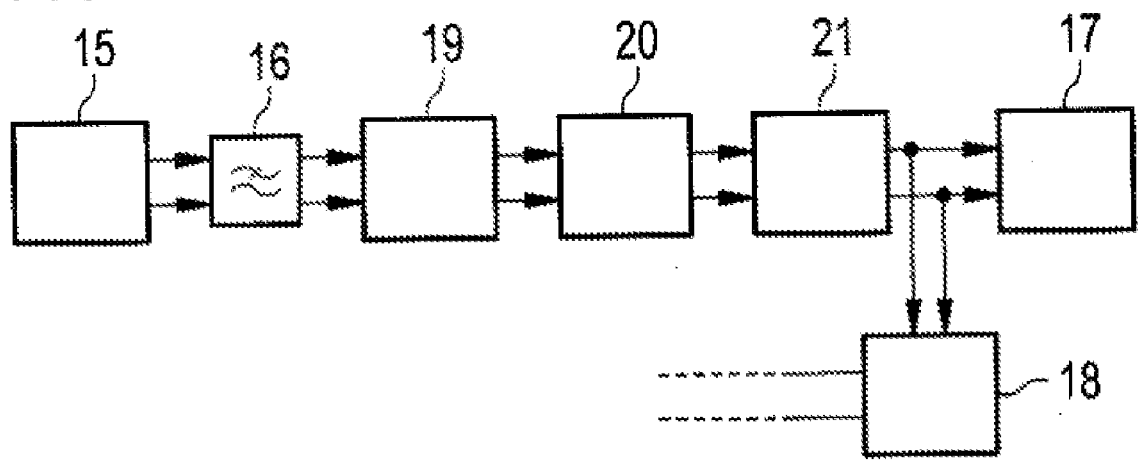
FIG. 2 shows a partial region of the circuit arrangement according to FIG. 1 for implementing the method when using an OFDM modulation method.

FIG. 2 shows a partial region of the arrangement according to the disclosure for implementing the method when using an OFDM modulation method. The suppression of the adjacent channel interference is divided between a plurality of assemblies including the FFT itself.

In this case, the sampling rate converter 15 converts the signal with twice the sampling rate required in principle. In this embodiment, the second digital low-pass filter 16 can be implemented as a halfband filter. The signal output at the output of the sampling rate converter 15 is the input signal of the low-pass filter 16, which filters out all signal components whose frequencies lie outside half the sampling rate of the sampling rate converter 15.

The filtered signal is subsequently divided by the divisor two in the decimation circuit 19, such that only every second sample is forwarded. In the circuit for removing the guard interval 20 that is connected downstream, that portion of the OFDM symbols which is required for the subsequent FFT is selected and the guard interval is removed. The FFT is carried out in the FFT circuit 21 disposed downstream, and the output signal thus generated is fed both to the demodulator (not illustrated in FIG. 2) and to the ACI detector 18.

The ACI detector 18 calculates the energy contained in the carriers to the right and left of the carrier of the signal of interest (SOI). If the value of the energy of the respective carrier calculated on the left-hand or right-hand side exceeds a threshold value, using the receiver 10 a frequency shift to an edge of the filter characteristic curve (lower or upper limiting frequency of the filter) of the low-pass filter arrangement 9 is generated in such a way that, by means of the frequency shift, the adjacent channel interference lies outside the filter characteristic curve of the low-pass filter arrangement 9. In a practical implementation, it is only ever the case that a very great attenuation of the adjacent channel interference is possible, but not total suppression.

In a manner analogous to the first output signal of the ACI detector 18, the signal causing the frequency shift, the frequency shift is eliminated again by means of the second output signal. This is done by the control of the arrangement for correcting the frequency shift 13 in the digital baseband arrangement 11 by means of the second output signal.

Figure 3:
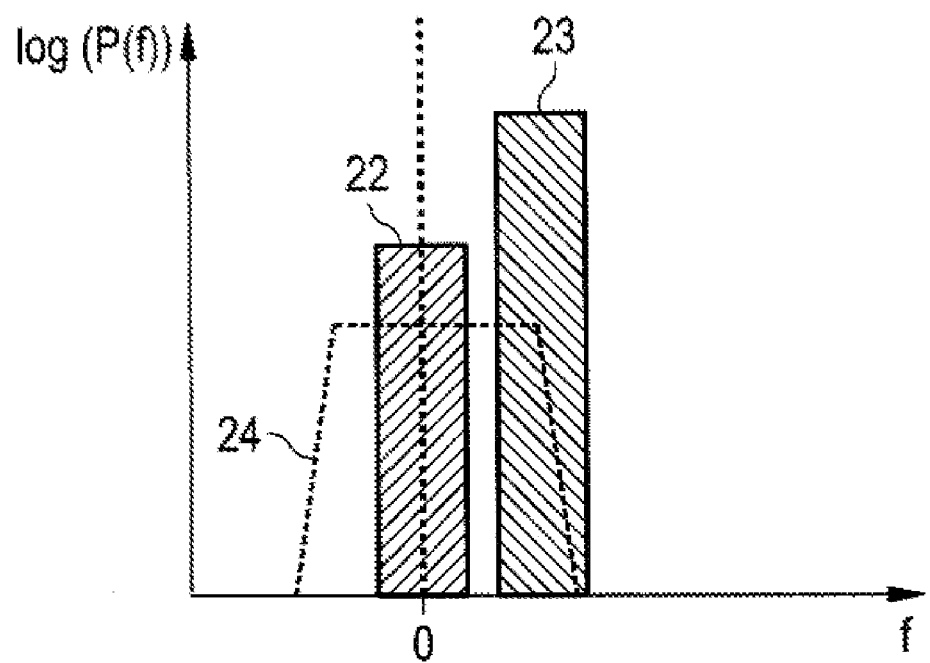
FIG. 3 shows an illustration of a frequency spectrum with a signal of interest carrier, an adjacent channel interference on an adjacent carrier N+1, and a characteristic curve of a low-pass filter.

FIG. 3 shows a signal of interest 22 with adjacent channel interference 23 in a spectral representation. The filter characteristic 24 of the low-pass filter 9 is additionally represented. In this case, the amplitudes of the signal of interest 22 and of the adjacent channel interference 23 are represented as they are before the application of the low-pass filter 9.

The signal of interest of a channel N is represented as centered on a zero frequency, the adjacent channel interference of a channel N+1 having a higher frequency.

Figure 4:
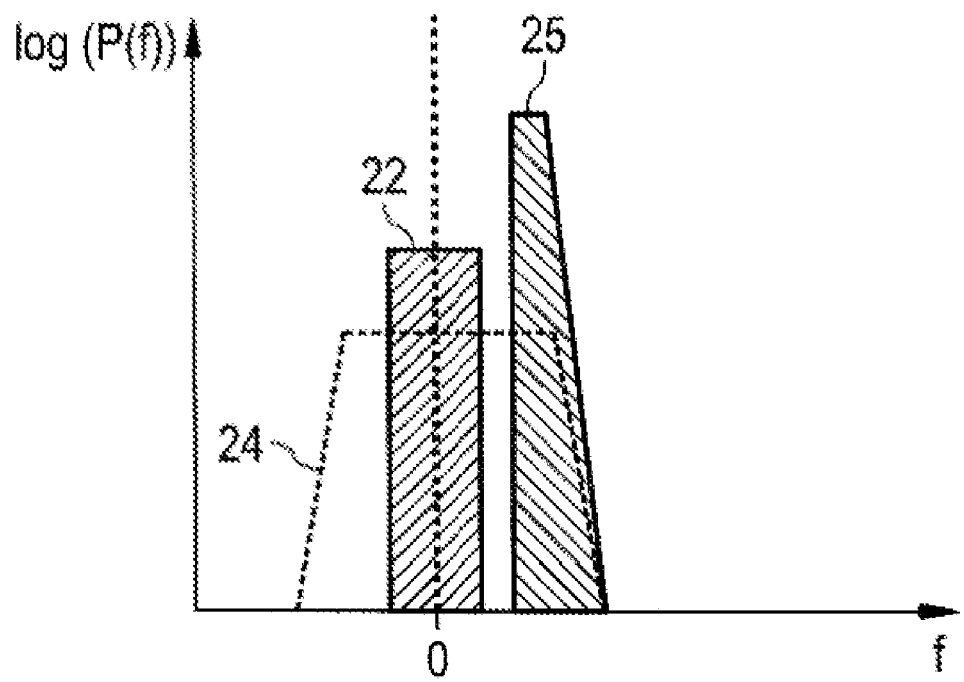
FIG. 4 shows a further illustration of a frequency spectrum with a signal of interest carrier, an adjacent channel interference on an adjacent carrier N+1, and a characteristic curve of a low-pass filter with the effect of the low-pass filter on the adjacent channel interference of the carrier N+1.

The represented characteristic curve of the low-pass filter 9 has a bandwidth that is not adapted in narrowband fashion to that of the signal of interest, but rather is wider than the signal of interest. This results in the disadvantage—known from prior designs—of such wideband low-pass filters 9 that sufficient suppression of the adjacent channel interference is not achieved. The result of this inadequate signal processing can be seen in FIG. 4.

FIG. 4 shows once again in a spectral representation the signal of interest 22 with adjacent channel interference 23, the effect of the low-pass filter 9 on part of the adjacent channel interference 23 being discernible. The effect consists in the fact that, starting in the region of the upper limiting frequency of the low-pass filter 9, an attenuation of the signal level of the adjacent channel interference 23 of the channel N+1 is effected which becomes greater as the frequency increases.

The representation clearly shows that a residual adjacent channel interference 25 remains in the spectrum, which leads to a disturbance of the functioning of the analog-to-digital converter 12 since a saturation of the analog-to-digital converters 12 of the baseband arrangement 11 can still occur as a result of the residual adjacent channel interference 25, with a correspondingly large signal amplitude as illustrated in the example.

FIG. 5 illustrates in the spectral representation the signal of interest 22 with a residual adjacent channel interference 25 at the output of the low-pass filter 9. In this representation, however, a frequency shift according to the disclosure was performed prior to the application of the low-pass filter 9. The representation shows the frequency shift both of the signal of interest SOI and of the adjacent channel interference of a channel N+1 towards the upper limiting frequency of the low-pass filter 9. In this case, the carriers are shifted from the zero frequency by $+\Delta f$.

This frequency shift results in a significantly greater attenuation of the adjacent channel interference of the channel N+1, which thus makes possible an interference-free signal processing via the circuits disposed downstream.

The frequency shift is reversed in the circuit arrangement for correcting the frequency shift 13 in the baseband circuit arrangement 11 under the control of the control signal of the ACI detector, by means of a frequency shift by $-\Delta f$ being effected. In this case, $|-\Delta f|=|-\Delta f|$.

When an in phase quadrature signal (IQ) is used, the frequency shift can be achieved simply by a multiplication of the complex signal by a complex rotating e function with a negative frequency.

Afterwards, an additional digital filtering of the signal is applied and the sampling rate can be reduced for simple further signal processing.

For the case where the interference is not caused by adjacent channel interference of a channel N+1 but rather by that of the channel N−1, the interference caused by the channel N−1 cannot be reduced by the frequency shift described above.

In this case, the output signals output by the ACI detector 18 after the calculation of the energies contained in the carriers N+1 and N−1 and the comparison with the predetermined threshold value are generated in such a way that a frequency shift is effected in the receiver 10 towards the lower limiting frequency of the low-pass filter 9, and the frequency shift is correspondingly corrected in the baseband arrangement. Such a scenario is illustrated in FIG. 6. Here the signal of interest was shifted by −Δf in the receiver prior to filtering by means of the low-pass filter 9. This frequency shift is correspondingly reversed again by +Δf in the digital baseband arrangement 11. |+Δf|=|−Δf| holds true here as well.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for signal processing in a receiver that can be tuned to different carriers, wherein an analog signal is received via an antenna, the method comprising:

filtering and amplifying the analog signal in a first step, converting the filtered and amplified signal into a baseband frequency that is filtered in a second method step, and, in a third method step, generating a digital signal from the filtered baseband frequency signal by means of analog-to-digital conversion, and, in a fourth method step, filtering the digital signal and subsequently decoding the filtered digital signal and outputting the decoded data, and further comprising determining from the digital signal the energy of the adjacent carriers N+1 and N−1, wherein a carrier N contains a signal of interest and the receiver is tuned to it, and comparing the energy value of the carriers N+1 and N−1 with a threshold value, in that in the case where the threshold value is exceeded, a frequency shift of the signal by +Δf or −Δf is effected in the second method step prior to the filtering, and in that the frequency shift thus produced is reversed by a frequency shift by −Δf or +Δf in the fourth method step prior to the filtering and the signal is decoded.

2. The method of claim 1 wherein the energy of a carrier N, which contains a signal of interest and to which the receiver is tuned, is determined from the digital signal and is used for threshold value setting in such a way that the ratio of the energy of the carrier N and the energy of the adjacent carriers N+1 or N−1 determines the frequency shift.

3. A circuit for implementing a method of signal processing, comprising:

a receiver having an antenna input, to which an antenna is connected and which has on the output side a low-pass filter and a baseband circuit connected downstream of the receiver and having an input-side analog-to-digital converter, which is connected to the low-pass filter, and an output for outputting the decoded data, and comprising in the baseband circuit an ACI detector that is adapted to determine the energy of the carriers and that has a first control output, which is fed back from the digital baseband circuit into the analog receiver in such a way that it is connected in controlling fashion to a frequency shifting circuit that acts upon the antenna input with a frequency shift, and which has a second control output, which, within the digital baseband circuit, is connected in controlling fashion to a circuit for correcting the frequency shift, which circuit revises the frequency shift.

4. The circuit of claim 3 wherein the frequency shifting circuit has a frequency generator, which has a control input connected to the first control output of the ACI detector, a received signal input and a frequency output, which is connected to the low-pass filter and in which a multiplier that applies the frequency shift to the received signal is arranged between the received signal input and the frequency output.

5. The circuit of claim 3 wherein the antenna input is connected to an input of a bandpass filter, an output of the bandpass filter is connected to an input of a low noise amplifier, and an output of the low noise amplifier is connected to the received signal input of the I/Q mixing circuit, the I/Q mixing circuit having a first and a second multiplier and also a phase shifting circuit, wherein the received signal input of the I/Q mixing circuit is respectively connected to a first input of the first multiplier and a first input of the second multiplier, the control input of the I/Q mixing circuit is connected to a second input of the first multiplier directly and to a second input of the second multiplier via the phase shifting circuit, the I/Q mixing circuit has a first and a second frequency output, wherein the first frequency output is connected to the output of the first multiplier and the second frequency output is connected to the output of the second multiplier, in that the frequency outputs of the I/Q mixing circuit are respectively connected to an input of a low-pass filter circuit, in that the outputs of the low-pass filter circuit respectively form the outputs of the receiver, in that the outputs of the receiver are respectively connected to an input of a baseband circuit connected downstream, in that each input of the baseband circuit is connected to an input of an analog-to-digital converter, in that outputs of the analog-to-digital converters are respectively connected to an input of a circuit for correcting the frequency shift, in that output of the circuit for correcting the frequency shift are respectively connected to an input of a first digital low-pass filter, in that outputs of the first digital low-pass filter are connected to inputs of a sampling rate converter connected downstream, in that outputs of the sampling rate converter are connected both to inputs of a second digital low-pass filter and to inputs of an ACI detector, in that outputs of the second digital low-pass filter are connected to inputs of a demodulator, in that an output of the demodulator is connected to the output of the baseband circuit for outputting the decoded data bits, in that the ACI detector has a first and a second control output, wherein the first control output is connected to an input of a frequency generator and an output of the frequency generator is connected to a second input of the I/Q mixing circuit, in that the second control output of the ACI detector is connected to a further input of the circuit for correcting the frequency shift.

6. The arrangement of claim 3 wherein the antenna input is connected to an input of a bandpass filter, in that an output of the bandpass filter is connected to an input of a low noise amplifier, in that an output of the low noise amplifier is connected to the received signal input of the I/Q mixing circuit, in that the I/Q mixing circuit has a first and a second multiplier and also a phase shifting circuit, wherein the received signal input of the I/Q mixing circuit is respectively connected to a first input of the first multiplier and a first input of the second multiplier, in that the control input of the I/Q mixing circuit is connected to a second input of the first multiplier directly and to a second input of the second multiplier via the phase shifting circuit, in that the I/Q mixing circuit has a first and a second frequency output, wherein the first frequency output is connected to the output of the first multiplier and the second frequency output is connected to the output of the second multiplier, in that the frequency outputs of the I/Q mixing circuit are respectively connected to an input of a low-pass filter circuit, in that the outputs of the low-pass filter circuits respectively form the outputs of the receiver, in that the outputs of the receiver are respectively connected to an input of a baseband circuit connected downstream, in that each input of the baseband circuit is connected to an input of an analog-to-digital converter, in that the outputs of the analog-to-digital converters are respectively connected to an input of a circuit for correcting the frequency shift, in that outputs of the circuit for correcting the frequency shift are respectively connected to an input of a first digital low-pass filter, in that the outputs of the first digital low-pass filter are connected to inputs of a sampling rate converter connected downstream, in that the outputs of the sampling rate converter are connected to the inputs of a second digital low-pass filter, in that the outputs of the second digital low-pass filter are connected to inputs of a decimation circuit, in that the outputs of the decimation circuit are connected to inputs of a circuit for removing a guard interval, in that the outputs of the circuit are connected to inputs of an FFT circuit in that the outputs of the FFT circuit are connected both to the inputs of a demodulator directly or via an interposed second digital low-pass filter and to the inputs of a ACI detector, in that an output of the demodulator is connected to the output of the baseband circuit for outputting the decoded data bits, in that the ACI detector has a first and a second control output, wherein the first control output is connected to an input of a frequency generator and an output of the frequency generator is connected to a second input of the I/Q mixing circuit, in that the second control output of the ACI detector is connected to a further input of the circuit for correcting the frequency shift.

7. A method of signal processing in a receiver adapted to be tuned to different signal carriers received on an antenna, the method comprising:

filtering and amplifying a received analog signal from the antenna;

converting the filtered and amplified analog signal into a baseband frequency signal that is filtered;

generating a digital signal from the filtered baseband frequency signal by means of an analog-to-digital conversion method, and filtering the digital signal and decoding the filtered digital signal to output decoded data; and determining from the digital signal the energy of adjacent carriers N+1 and N−1, wherein a carrier N contains a signal of interest to which the receiver is tuned, and comparing energy values of adjacent carriers with a threshold value, and where the threshold value is exceeded, frequency shifting the baseband frequency prior to the filtering of the baseband frequency signal, and reversing the shifting of the baseband frequency prior to filtering of the digital signal.

8. The method of claim 7 wherein determining the energy of adjacent carriers comprises determining from the digital signal the energy of the adjacent carriers N+1 and N−1, where the carrier N contains a signal of interest to which the receiver is tuned, and comparing the energy value comprises comparing the energy value of the carriers N+1 and N−1 with the threshold value.

9. The method of claim 8 wherein the energy of the carrier N is determined from the digital signal and is used in setting the threshold value so that the ratio of the energy of the carrier N and the energy of the adjacent carriers N+1 or N−1 determines the frequency shift.

10. A circuit, comprising:

a bandpass filter and low noise amplifier adapted to filter and amplify a received analog signal;

an I/Q mixing circuit adapted to receive the filtered and amplified signal and to output a baseband frequency signal that is filtered, the I/Q mixing circuit comprising first and second multipliers for phase shifting the baseband frequency signal prior to filtering; and a baseband circuit comprising an analog-to-digital converter that receives the filtered baseband frequency signal and outputs a digital signal to a filter and decoder that output a filtered digital signal and decoded data, respectively, the baseband circuit further comprising a frequency shifting circuit that reverses the frequency shift of the first and second multipliers in the I/Q mixing circuit, a filter that filters the frequency-shifted digital signal and outputs to a sampling rate converter that converts the signal with a sampling rate, the output of which is filtered, and the filtered signal is divided by the divisor 2 in a decimation circuit, the baseband circuit further comprising an ACI detector that receives the sampled output signal from the sampling rate converter and generates a control signal to a frequency generator that outputs a control signal to the first and second multipliers in the receiver and a control signal to the frequency shift circuit.

11. The circuit of claim 10 wherein the ACI detector is adapted to determine from the sampled digital signal the energy of adjacent carriers to a carrier signal N that contains a signal of interest and to compare the energy value of the adjacent carriers with a threshold value and determine a frequency shift control signal for the frequency generator 4 and the frequency shift circuit 13.

12. The circuit of claim 11 wherein the ACI circuit compares the energy value of the adjacent carriers N+1 and N−1 with the threshold value in determining the frequency shift.

* * * * *